Feb. 2, 1932.  H. W. INGLE  1,843,285
WARE TRANSFERRING DEVICE
Original Filed Aug. 30, 1924    4 Sheets-Sheet 3

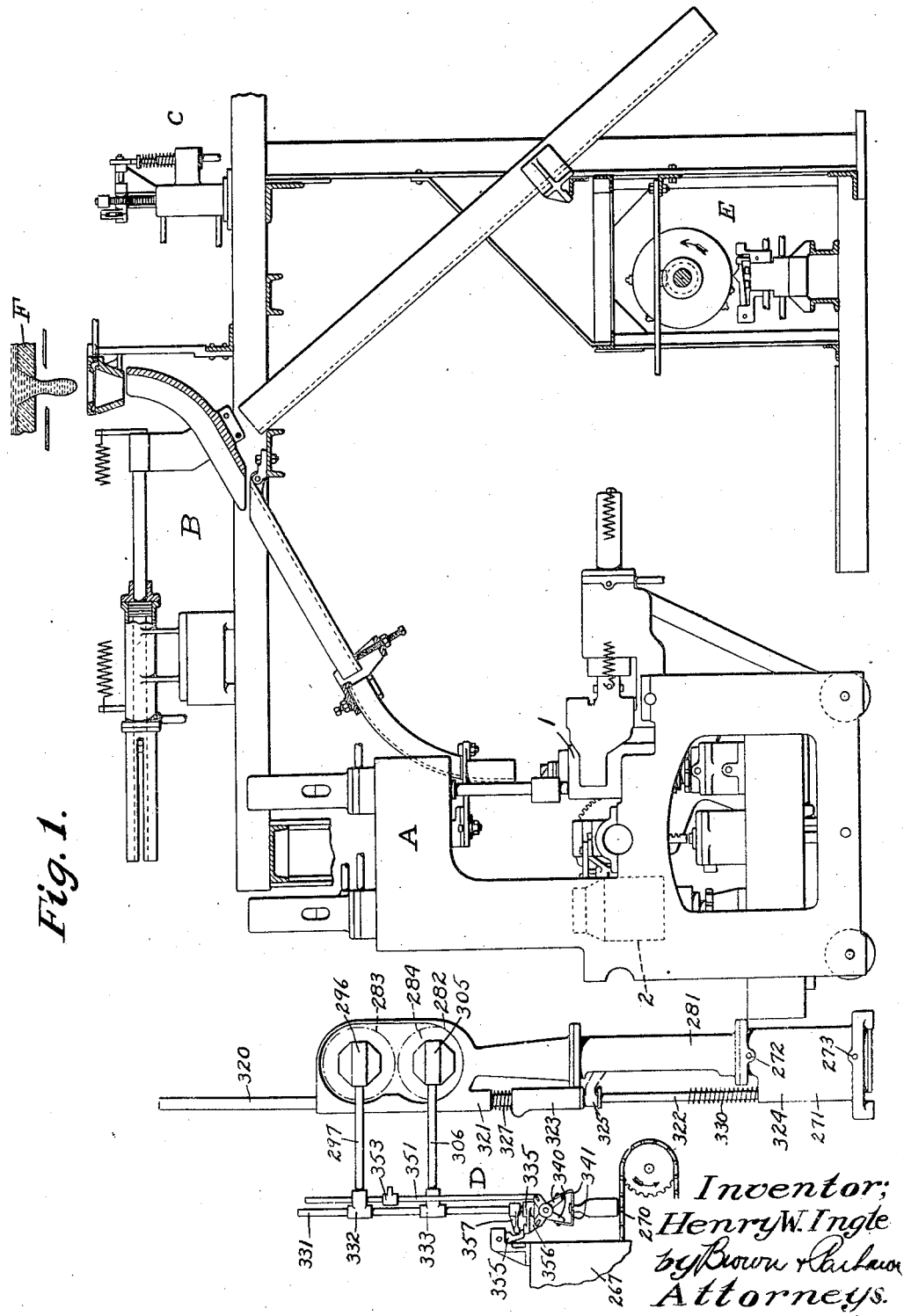

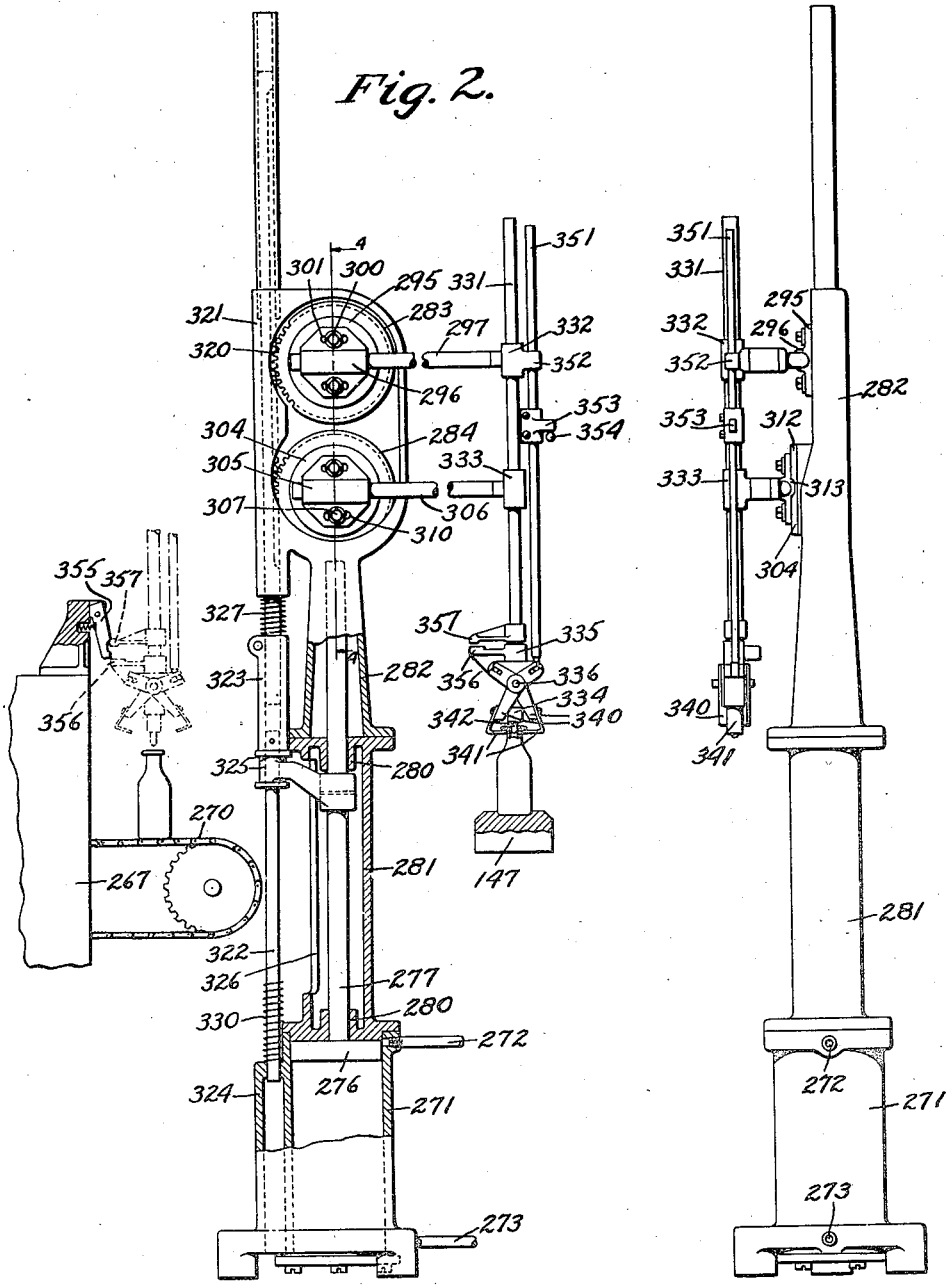

Inventor;
Henry W. Ingle
by Burns Parker
Attorneys.

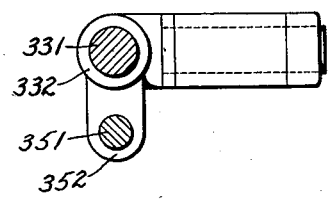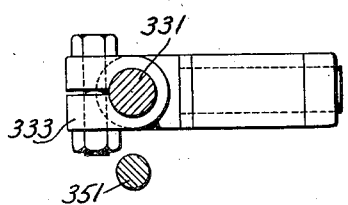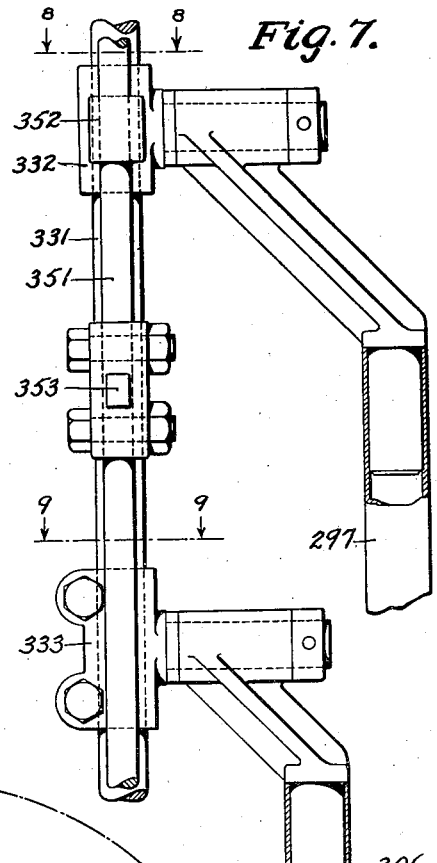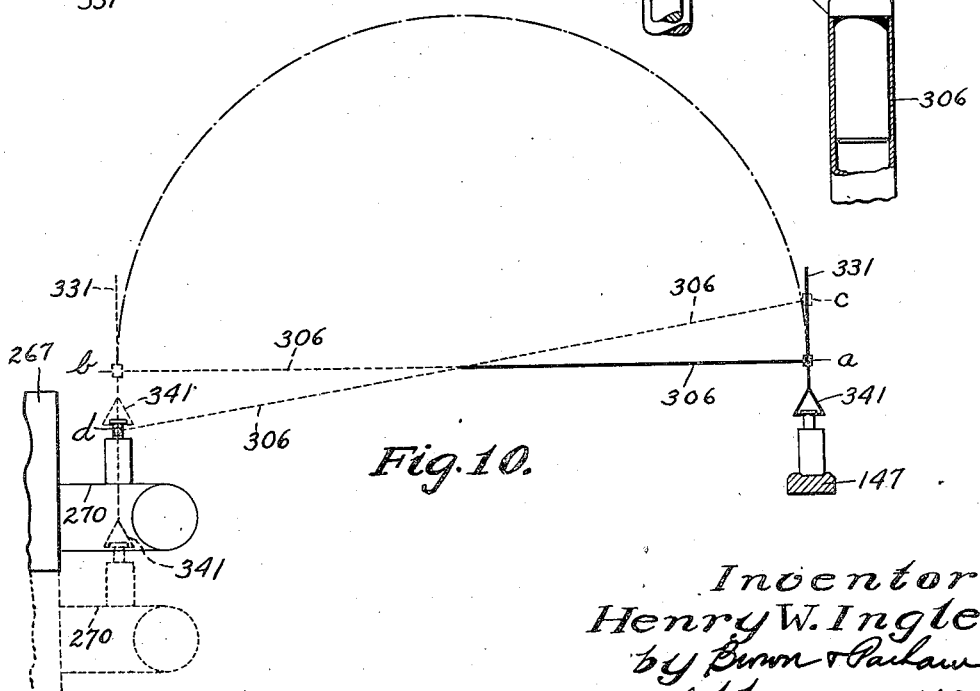

Patented Feb. 2, 1932

1,843,285

UNITED STATES PATENT OFFICE

HENRY W. INGLE, OF WEST HARTFORD, CONNECTICUT, ASSIGNOR TO HARTFORD-EMPIRE COMPANY, OF HARTFORD, CONNECTICUT, A CORPORATION OF DELAWARE

WARE TRANSFERRING DEVICE

Original application filed August 30, 1924, Serial No. 735,079. Divided and this application filed November 22, 1929. Serial No. 408,990.

This invention relates to devices for transferring articles from a receiving point to a delivery point and, more particularly, to a device for transferring blown glassware from a pick-up station, which may be a point in or adjacent to a ware forming machine, at which point the glassware may receive its final shaping operation, and transferring such ware to any suitable receiving station, which may be on the conveyor of an annealing lehr.

The present application is a division of my prior application, Ser. No. 735,079, filed August 30, 1924.

An object of the present invention is to provide an apparatus of the character set forth embodying a simple and efficient ware transfer device or takeout, which may be used for removing ware from finishing molds of a forming machine and delivering it at a desired location, such as upon a conveyor mechanism or to a lehr, and which may preferably be easily adjusted to operate between different levels.

A further object of the invention is to provide a transfer device of the character described, in which various adjustable means are provided to enable the device to be used in a large variety of different positions, and in which the arc of travel of the transferring means may be varied as desired.

Further objects of the invention include such novel features of construction and arrangement as are disclosed in the accompanying specification and drawings, in which:

Figure 1 is a side elevational view of a glass working apparatus showing a transfer device embodying the present invention associated therewith, certain parts being omitted and certain other parts being shown in section;

Fig. 2 is a side elevational view of a ware transferring mechanism embodying my invention as applied to an operation including a transfer of blown articles from a blow mold and bottom plate of a ware forming machine to a lehr conveyor, certain portions thereof being illustrated in section;

Fig. 3 is a side elevational view of the structure shown in Fig. 2;

Fig. 4 is an enlarged sectional elevation taken on line 4—4 of Fig. 2;

Fig. 5 is an enlarged elevational view of the tongs mechanism, certain parts being shown in section;

Fig. 6 is a sectional elevational view taken on line 6—6 of Fig. 5;

Fig. 7 is an enlarged elevational view illustrating in detail the construction of the arms of the ware transferring mechanism;

Fig. 8 is a sectional plan view taken on line 8—8 of Fig. 7;

Fig. 9 is a sectional plan view taken on line 9—9 of Fig. 7; and,

Fig. 10 is a diagrammatic view illustrating the movement of one of the ware transferring arms between the shaping machine and the leer conveyor, and illustrating the manner in which the same may be adjusted to operate between different levels.

My invention is shown in connection with a single unit A of a glass shaping machine, which may be constructed in several similar units, but in which event each unit is provided with a transfer device identical with that hereinafter shown and described and embodying the present invention. Each unit or section comprises a single permanently inverted stationary blank mold 1 and a single movable blow mold 2, and is capable of independently performing a complete molding operation; a delivery mechanism B for successively supplying the several shaping machines with mold charges of predetermined size and shape from a single glass feeding device F; an initial or puff blowing device C for imparting a preliminary configuration to the blank in the blow mold subsequent to its transfer thereto from the blank mold and prior to the final blowing operation; a take-out device D for each unit for removing the ware from each of the shaping machines and placing it in a desired location on a conveyor; and a pressure controlling mechanism E for adjustably regulating the application of the operating fluid pressures to each of the shaping machine units or sections and to the delivery and take-out instrumentalities, and also the application of different blowing pressures and the settling suction, in proper sequence and in timed relation with respect to each of the several units and to the operation of the feeding device.

Inasmuch as the present application is limited to the transfer device or take-out, as it is called in my original application above referred to, the operation of the shaping machine and the charge delivery devices will not be further described in detail herein, but reference may be had to my original application for a disclosure of the various operations and constructions of the shaping machine, charge guiding and feeding devices, and the timer.

A machine built in a substantially similar manner to that of my parent application above referred to is shown in the published British patent to Hartford-Empire Company, No. 257,637, Sept. 7, 1926.

In the following specification, identical reference characters are used to denote the several parts as in my original application above referred to, of which this application is a division.

The take-out mechanism D, which removes the ware from the blow mold 2 at the completion of the finish blowing operation and conveys it to another apparatus for further treatment, herein shown as comprising a leer 267 and a cooperating conveyor 270 is illustrated in Figs. 1 to 10. It embodies in its construction a cylinder 271 which constitutes the base of the mechanism, and which is supplied with fluid under pressure through pipes 272 and 273. Suitable valves are provided in these pipes for controlling the operating speed of the mechanism. A piston 276 operates within the cylinder 271 and is provided with a piston rod 277 which is slidably mounted in bearings 280 provided on a column 281. This column is mounted on the cylinder 271 and supports a housing 282 within which upper and lower spur gears 283 and 284 are rotatably mounted.

The gears 283 and 284 are recessed on one side to receive bearing disks 285 and 286 (Fig. 4) upon which they are mounted by means of interposed ball bearings 287 and 290. The disks 285 and 286 are secured to the housing 282 in any preferred manner and are properly centered thereon by means of pins 291 and 292. The gears 283 and 284 may be removed from their mountings by detaching rings 293 and 294 which are carried thereby and which constitute portions of the ball bearing race-ways. By means of this construction, the gears 283 and 284 are provided with bearings having relatively small axial dimensions and relatively large radial dimensions which will effectively resist lateral strains.

The upper gear 283 is formed with a relatively short hub portion 295 upon which a holder 296, having an arm 297 fixed therein, is slidably mounted for radial adjustment by means of bolts 300, which engage slots 301 provided in the holder (Fig. 2). The holder 296 is formed with a diametrically disposed tongue or key portion 302 which slidably engages a groove 303 in the hub 295 and prevents the holder and the arm 297 from rotating relative to the gear 283. The lower gear 284 is provided with a relatively long hub portion 304 upon which a holder 305, having an arm 306 fixed therein, is mounted for rotary and radial adjustment by means of bolts 307 which extend through slots 310 and 311 that are respectively provided in the holder 305 and in an intermediate plate 312. The holder 305 is also provided with a tongue or key 313 which slidably engages a groove 314 in the plate 312, and the latter is provided with a stud portion 315 which rotatably engages an axial opening 316 in the hub 304. By loosening the bolts 307, the holder 305 may not only be moved radially on the plate 312, in order to adjust the radius of swing of the arm 306 equal to that of the arm 297, but the holder may be turned together with the plate 312 relative to the gear 284 in order to adjust the arm 306 parallel to the arm 297. This latter adjustment is generally made when the machine is originally assembled, and the respective parts are fixed in their adjusted position by means of a pin 317, which permanently secures the plate 312 to the hub 304. It will be observed, from an inspection of Fig. 4, that by means of the difference in the lengths of the hub portions 295 and 304 of the gears 283 and 284, the arms 297 and 306 swing in different vertical planes, in order to permit their passage by each other during their travel between the blow mold and the conveyor. On account of the large radial dimensions of the bearings for the gears 283 and 284 mentioned above, any lateral strains encountered by the arms 297 and 306 are effectively resisted.

The gears 283 and 284 are rotated in the same direction by means of a rack bar 320 which is slidably mounted for vertical movement in a guideway 321, which is formed integrally with the housing 282. The lower end of the rackbar 320 is adjustably secured to the upper end of a rod 322 by means of a clamp 323. The lower end of the rod 322 is slidably mounted in a guideway 324 adjacent to the cylinder 271. The rack bar 320 is raised and lowered in order to rotate the gears 283 and 284 and to swing the arms 297 and 306 carried thereby, by means of an arm 325, which is secured to the piston rod 277 and which projects outwardly through a slot 326 in the column 281. The upward and downward movement of the several parts is cushioned by means of a spring 327 which surrounds the lower end of the rack bar 320 between the lower end of the guideway 321 and the clamp 323 and a spring 330 which surrounds the rod 322 between the arm 325 and the guideway 324.

A rod 331 is mounted for vertical adjustment in a sleeve 332 and in a clamp 333 which are pivotally mounted upon the arms 297 and 306 respectively, and is provided at its lower end with an extension 334 (Figs. 5 and 6) upon which is slidably mounted a tongs actuating member, herein shown as a sleeve 335. The sliding movement of the sleeve 335 is limited by means of a pin 336 which is fixed in the extension 334 and extends through slots 337 in the sleeve. A pair of bifurcated cross levers 340 straddle the sleeve 335 and are pivotally mounted intermediate of their extremities upon the pin 336. Opposed fingers or tongs 341 are removably secured to the lower ends of the levers 340 and cooperate with a steadying pin 342, which is detachably secured to the extension 334, in gripping the neck of a bottle. The upper extremities of the levers 340 are provided with slots 343 for engaging pins 344 which are carried by ears 345 formed on the sleeve 335. When the sleeve 335 is slid upwardly on the extension 334, the arms 340 will be actuated to close the tongs 341, and when the sleeve is slid downwardly, the tongs will be opened. The tongs 341 are yieldably maintained in either of these positions by means of a suitable spring detent 346 that is carried by the sleeve 335 for engagement with upper and lower grooves 347 and 350 respectively, which are formed in the extension 334.

The sleeve 335 is moved relatively to the extension 334 in order to respectively open and close the fingers 341, by means of a rod 351, which is connected at its lower end to one of the pins 344. This rod extends parallel to the rod 331 and is slidably mounted adjacent to its upper end in a guideway 352 which is carried by the sleeve 332 (Fig. 2). An arm 353 is adjustably secured to the rod 351 for engagement with a stop pin 354 which is fixed in the path of the arm 353 in any convenient manner, not shown.

When the take-out device is actuated to remove a bottle from the blow mold 2, fluid pressure is admitted into the lower portion of the cylinder 271, which raises the rack bar 320 and rotates the gears 283 and 284, thereby swinging the tong mechanism in a clockwise direction, Fig. 2, until the arm 353 engages the pin 354 and arrests the downward movement of the rod 351 and the sleeve 335. The rod 331 and the extension 334, however, continue to move downwardly a distance equal to the length of the slots 337 and the fingers 341 are thereby closed about the neck of the bottle. This continued downward movement of the extension 334 after the movement of the sleeve 335 has been arrested, forces the lower groove 350 out of engagement with the detent 346 and carries the upper groove 347 into engagement therewith. As soon as the ware is thus engaged by the fingers 341, the movement of the transferring mechanism is reversed by admitting fluid pressure into the upper portion of the cylinder 271 and the rod 331 is raised and swung to the delivery point, the detent 346 through engagement with the upper groove 347 preventing the fingers 341 from releasing the ware during such movement. The fingers 341 are opened to deposit the ware on the conveyor 270 by means of a spring latch 355 which is suitably mounted upon the leer 267. This latch engages above an arm 356 which is formed on the sleeve 335 and prevents the same from rising upon the upward movement of the rod 331 until the fingers 341 have been opened to release the ware. At this time, an arm 357 which is carried by the rod 331, engages the latch 355 and forces it out of the path of movement of the arm 356. As soon as the latch 355 has thus released the arm 356, the sleeve 335 rises with the rod 331 in its return movement to the blow mold 2. As the rod 331 rises, during the period of time that the sleeve 335 is maintained stationary by the engagement of the latch 355 with the arm 356, the groove 347 is forced out of engagement with the detent 346 and the groove 350 moved into engagement therewith. The fingers 341 are, therefore, maintained in an open position during their travel back to the blowing station and in position to again close about the neck of a succeeding bottle.

The take-out device may be adjusted to transfer ware between points at the same or different levels. For example, the leer conveyor 270 may be located at the same level as the bottom plate 147 of the blow mold, as is diagrammatically illustrated in full lines in Fig. 10. In such instance, the lower arm 306 of the transfer device travels through the arc $a\ b$ in transferring ware from the blow mold to the leer. At each extreme limit of travel of the arm 306 through this arc, the arm occupies a horizontal position with its extremity located at a distance above the top of the ware, and with the rod 331 adjusted to enable the fingers 341 to operatively engage and disengage from the neck of the ware. It may, however, occur that the leer conveyor is located at a lower level than that of the bottom plate 147, as is illustrated in dotted lines in the figure mentioned. In such instance the arc of travel $a\ b$ of the arm is shifted in a counter-clockwise direction to the position $c\ d$. This adjustment is effected by loosening the clamp 323 and lowering the rack bar 320 with respect to the piston 276 and its directly associated parts. When the arc of travel of the arm 306 has been thus shifted, the extremity of the arm at each extreme limit of travel thereof occupies a position above the top of the ware, and at a distance therefrom at the right as seen in Fig. 10 which is greater than such distance before adjustment. The rod 331 is, therefore, lowered when the arc of travel of the arm is thus shifted, in order to operatively position the fingers 341 relative to the neck of the ware. This adjustment is effected by loosening the clamp 333 and sliding the rod 331 downwardly through the clamp and the sleeve 332. Conversely, the transfer mechanism may be adjusted to convey ware to a delivery point which is located at a level above that of the bottom plate 147 by reversing the adjustments above described. When the arc of travel of the arm 306 of the transfer mechanism is shifted, in order to deliver ware between points at different levels, the radius of swinging movement of the arms is correspondingly increased or decreased by loosening the bolts 300 and 307 and adjusting the arms 297 and 306 in a radial direction.

While I have shown and described a transfer apparatus particularly with respect to a specific forming machine and used in that combination as a take-out to remove finished articles from the final blow mold of such machine and place them on a leer conveyor, it is to be understood that the invention is not limited to this use and that the device could be and is contemplated for use as a transfer for any and all purposes for which it may be suitable either with glass in transferring blown or otherwise formed articles from one point to another point or for any ware with which it may be adaptable for use. I do not wish to be limited therefore except by the scope of the appended claims, which are to be construed as broadly as the state of the prior art permits.

I claim:

1. Glassware transferring mechanism, comprising a pair of arms mounted for oscillatory movement in parallel relation with respect to each other between a ware-receiving station and a ware-delivery station, tongs carried by said arms, means connecting said arms to cause them to move in unison, means for actuating said connecting means, means for adjusting the position of said tongs relatively to said arms, and additional means for adjusting said actuating means relative to said connecting means to cause said tongs to operate between different levels.

2. Glassware transferring mechanism, comprising a support, a disk carried by said support, a gear journaled on said disk, an arm carried by said gear, a tongs mechanism carried by said arm, and means for actuating said gear to oscillate said arm.

3. Glassware transferring mechanism, comprising a transfer arm, means for moving said arm between a ware-receiving station and a ware-delivery station, a support carried by said arm, tongs mechanism carried by said support, a member mounted for movement relative to said support and operatively connected to said tongs, means for effecting relative movement between said support and said member at said ware-receiving station to close said tongs to engage the ware, and means independent of the last named means for effecting relative movement between said support and said member at said delivering station to open the said tongs to release the ware.

4. Glassware transferring mechanism, comprising a transfer arm, means for moving said arm between a ware receiving station and a ware delivering station, a rod carried by said arm, tongs mechanism carried by said rod, a sleeve slidably mounted on said rod and operatively connected to said tongs, and means for arresting the movement of said sleeve at said receiving and delivering stations during movement of said rod to cause said tongs to respectively move into and out of operative engagement with the ware at said stations.

5. Glassware transferring mechanism, comprising a transfer arm, means for moving said arm between a ware receiving station and a ware delivering station, a rod carried by said arm, tongs mechanism carried by said rod, a sleeve slidably mounted on said rod and operatively connected to said tongs, means for arresting the movement of said sleeve at said receiving station during the continued movement of said rod to cause said tongs to move into operative engagement with the ware, and means for delaying the return movement of said sleeve at said delivering station relative to that of said rod to cause said tongs to move out of operative engagement with said ware.

6. Glassware transferring mechanism, comprising a transfer arm, means for moving said arm between a ware receiving station and a ware delivering station, a rod carried by said arm, tongs mechanism carried by said rod, a sleeve slidably mounted on said rod and operatively connected to said tongs, a stop for arresting the movement of said sleeve at said receiving station during the continued movement of said rod to cause said tongs to move into engagement with the ware, and a latch for delaying the return movement of said sleeve at said delivering station with respect to that of said rod to cause said tongs to move out of engagement with said ware.

7. Glassware transferring mechanism, comprising a transfer arm, means for moving said arm between a ware receiving station and a ware delivering station, a rod carried by said arm, tongs mechanism carried by said rod, a sleeve slidably mounted on said rod and operatively connected to said tongs, a stop for arresting the movement of said sleeve at said receiving station in advance of the discontinuance of the movement of said rod to cause said tongs to move into operative engagement with the ware, a latch for delaying the movement of said sleeve away from said delivering station relative to such movement of said rod to cause said tongs to move out of engagement with the ware, and means carried by said rod for disengaging said latch from said sleeve subsequent to the opening of said tongs.

8. Glassware transferring mechanism, comprising a transfer arm, means for moving said arm between a ware receiving station and a ware delivering station, a support carried by said arm, a ware steadying pin and coacting tongs mechanism carried by said support, a member mounted for movement relative to said support and operatively connected to said tongs, means for arresting the movement of said member toward said receiving station prior to that of said support to cause said tongs to engage the ware simultaneously with the positioning of said steadying pin therein, and means for delaying the movement of said member away from the delivering station during such movement of said support to cause said tongs to open simultaneously with the withdrawal of said steadying pin from the ware.

9. Glassware transferring mechanism, comprising a transfer arm, means for moving said arm between a ware receiving station and a ware delivering station, a rod carried by said arm, a ware steadying pin and coacting tongs mechanism carried by said rod, a sleeve slidably mounted on said rod and operatively connected to said tongs, a stop for arresting the movement of said sleeve toward said receiving station prior to that of said rod to cause said tongs to engage the ware simultaneously with the positioning of said steadying pin therein, and a stop for delaying the movement of said sleeve away from the delivering station during such movement of said rod to cause said tongs to open simultaneously with the withdrawal of said steadying pin from the ware.

10. Glassware transferring mechanism, comprising a transfer arm, means for moving said arm between a ware receiving station and a ware delivering station, a rod carried by said arm, a ware steadying pin and coacting tongs mechanism carried by said rod, a sleeve slidably mounted on said rod and operatively connected to said tongs, a stop for arresting the movement of said sleeve toward said receiving station prior to that of said rod to cause said tongs to engage the ware simultaneously with the positioning of said steadying pin therein, a latch for delaying the movement of said sleeve away from the delivering station during such movement of said rod to cause said tongs to open simultaneously with the withdrawal of said steadying pin from the ware, and means carried by said rod for disengaging said latch from said sleeve subsequent to the opening of said tongs.

11. Glassware transferring mechanism, comprising a transfer arm, means for moving said arm between a ware receiving station and a ware delivering station, a rod carried by said arm, a ware studying pin and coacting tongs mechanism carried by said rod, a sleeve slidably mounted on said rod and operatively connected to said tongs, a stop for arresting the movement of said sleeve toward said receiving station in advance of the discontinuance of the movement of said rod to cause said tongs to engage the ware simultaneously with the positioning of said steadying pin therein, a latch for delaying the movement of said sleeve away from the delivering station during such movement of said rod to cause said tongs to open simultaneously with the withdrawal of said steadying pin from the ware, means carried by said rod for disengaging said latch from said sleeve subsequent to the opening of said tongs, and a latch for yieldably maintaining said tongs in a closed position during their travel from said receiving station to said delivering station, and in an open position during their travel back to said receiving station.

12. Glassware transferring mechanism, comprising an arm, tongs mechanism carried by said arm, means for imparting rotative oscillatory movements to said arm about a horizontal axis, means for adjustably shifting the arc of travel of said arm angularly about said axis to cause said tongs to operate between different levels, and means operating positively to maintain said tongs in a position to hold a glass article vertical throughout the movement thereof and in any adjusted position of the arc of travel of said arm.

13. Glassware transferring mechanism, comprising a pair of arms mounted for oscillatory movement in parallel relation with respect to each other between a ware-receiving station and a ware-delivery station and about offset axes, tongs carried and guided by said arms respectively, means connecting said arms to cause them to move in unison, means for actuating said connecting means, means for shifting the arcs of travel of said arms angularly about said axes, and means for adjusting the position of said tongs relative to said arms, whereby said tongs are operable between stations at different levels.

14. Glassware transferring mechanism, comprising a support, an arm pivoted to said support on a horizontal axis, tongs mechanism carried by said arm, means for oscillating said arm about said axis including a reciprocating member and power means for reciprocating said member, a mechanical linkage for transmitting motion from said member to said arm, and means for shifting the arc of travel of said arm angularly about said axis including means for varying the relative positions of two elements of said mechanical linkage, whereby to cause said tongs to operate between different levels.

Signed at Hartford, Conn., this 20th day of November 1929.

HENRY W. INGLE.